United States Patent
Emerzian et al.

(10) Patent No.: US 6,651,993 B1
(45) Date of Patent: Nov. 25, 2003

(54) TRANSPORT APPARATUS

(76) Inventors: Thomas Emerzian, 2555 N. Argyle, Fresno, CA (US) 93727; Don Helman, 2555 N. Argyle, Fresno, CA (US) 93727

(*) Notice: Subject to any disclaimer, the term of this patent is extended or adjusted under 35 U.S.C. 154(b) by 94 days.

(21) Appl. No.: 10/074,474

(22) Filed: Feb. 12, 2002

(51) Int. Cl.[7] .................................................. B62B 3/00
(52) U.S. Cl. ............................... 280/47.34; 280/47.18; 280/47.17
(58) Field of Search ................................ 280/35, 47.17, 280/47.18, 47.34, 47.35, 87.041, 87.042, 87.01, 200, 202

(56) References Cited

U.S. PATENT DOCUMENTS

| | | | |
|---|---|---|---|
| 1,006,708 A | 10/1911 | Yost | 280/87.041 |
| 1,059,152 A | 4/1913 | Hammond | 280/87.041 |
| 1,124,897 A | 1/1915 | Hasskarl | 280/87.041 |
| 1,289,361 A | 12/1918 | Bastman | 280/87.041 |
| 1,644,535 A | 10/1927 | Mayer | 280/200 |
| 1,874,792 A | 8/1932 | Myers | 280/200 |
| 2,134,318 A | 10/1938 | Ruzich | 280/87.041 |
| 3,314,494 A | 4/1967 | Weitzner | 280/202 |
| 3,374,000 A | 3/1968 | Wetzel | 280/87.041 |
| 3,834,726 A * | 9/1974 | Hobza | 280/87.041 |
| 3,949,999 A | 4/1976 | Breslow | 280/200 |
| 4,093,252 A * | 6/1978 | Rue | 280/87.042 |
| 4,145,065 A * | 3/1979 | Kupka | 280/87.041 |
| 4,323,258 A | 4/1982 | Culpeper | 280/87.041 |
| 5,011,169 A | 4/1991 | Henderson et al. | 280/202 |
| 5,090,716 A | 2/1992 | Borden | 280/87.042 |
| 5,193,831 A | 3/1993 | Capitoli | 280/202 |
| 5,615,902 A * | 4/1997 | Reurich | 280/47.18 |
| 5,820,146 A * | 10/1998 | Van Ligten | 280/87.041 |
| 6,234,501 B1 * | 5/2001 | Chen | 280/87.041 |
| 6,260,866 B1 * | 7/2001 | Cheng | 280/87.05 |
| 6,497,423 B1 * | 12/2002 | Perelli et al. | 280/47.34 |

* cited by examiner

Primary Examiner—Lesley D. Morris
Assistant Examiner—L. Lum
(74) Attorney, Agent, or Firm—Thomas R. Lampe

(57) ABSTRACT

Transport apparatus for use and propulsion by an individual includes a receptacle and a support board pivotally attached to the receptacle. A pair of spaced rear receptacle wheels and a front receptacle wheel are connected to the bottom of the receptacle, the front receptacle wheel being swivel mounted. The front end of the support board is connected by a swivel to the receptacle and a support board wheel is located at the other end of the support board.

10 Claims, 4 Drawing Sheets

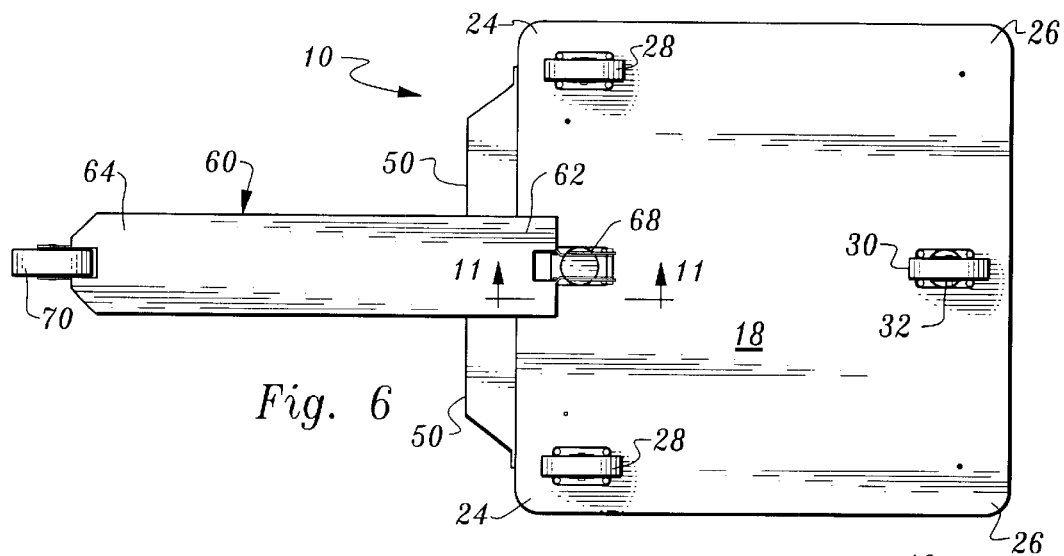
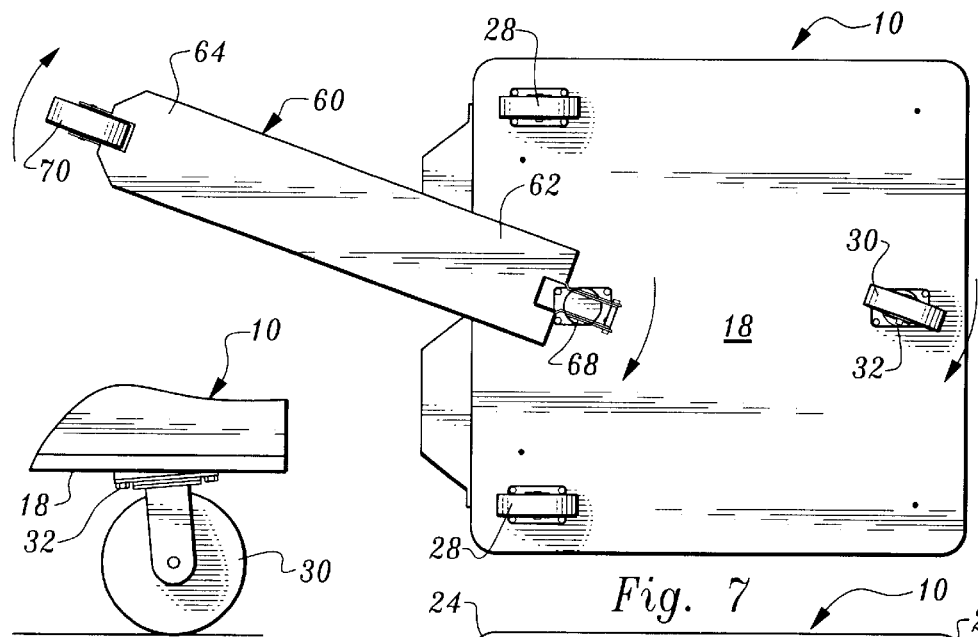
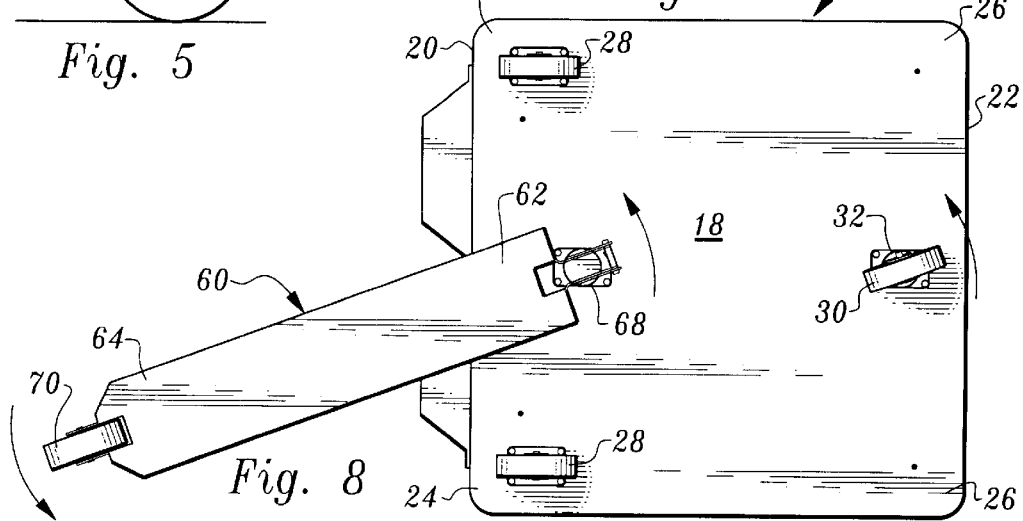

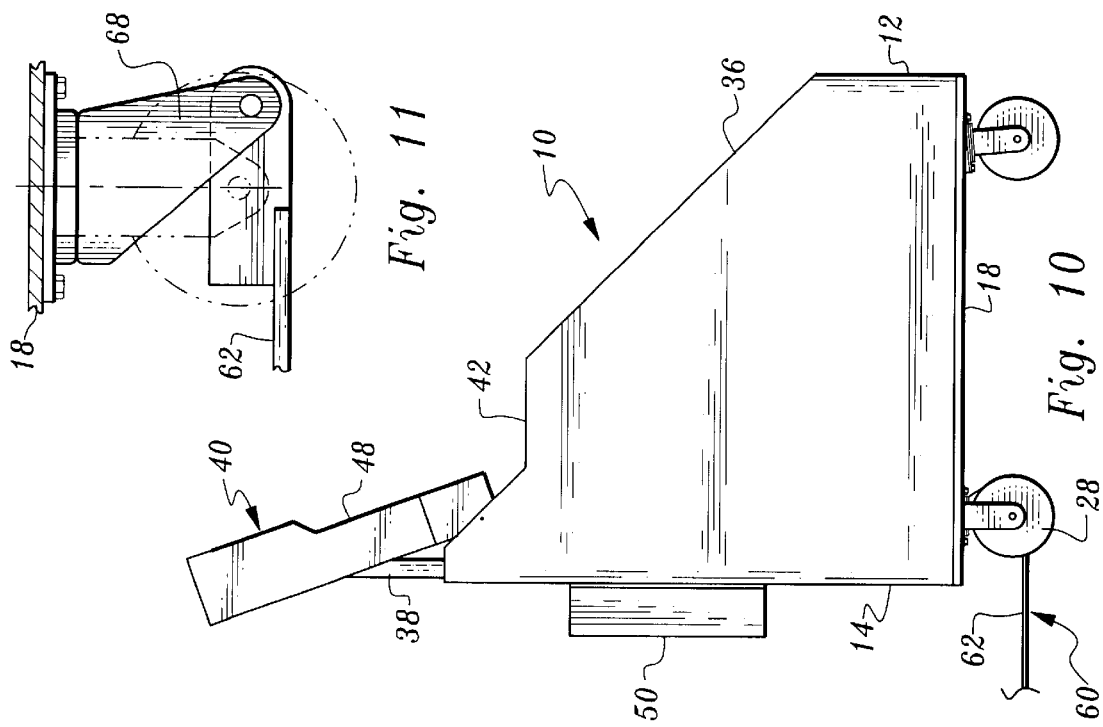
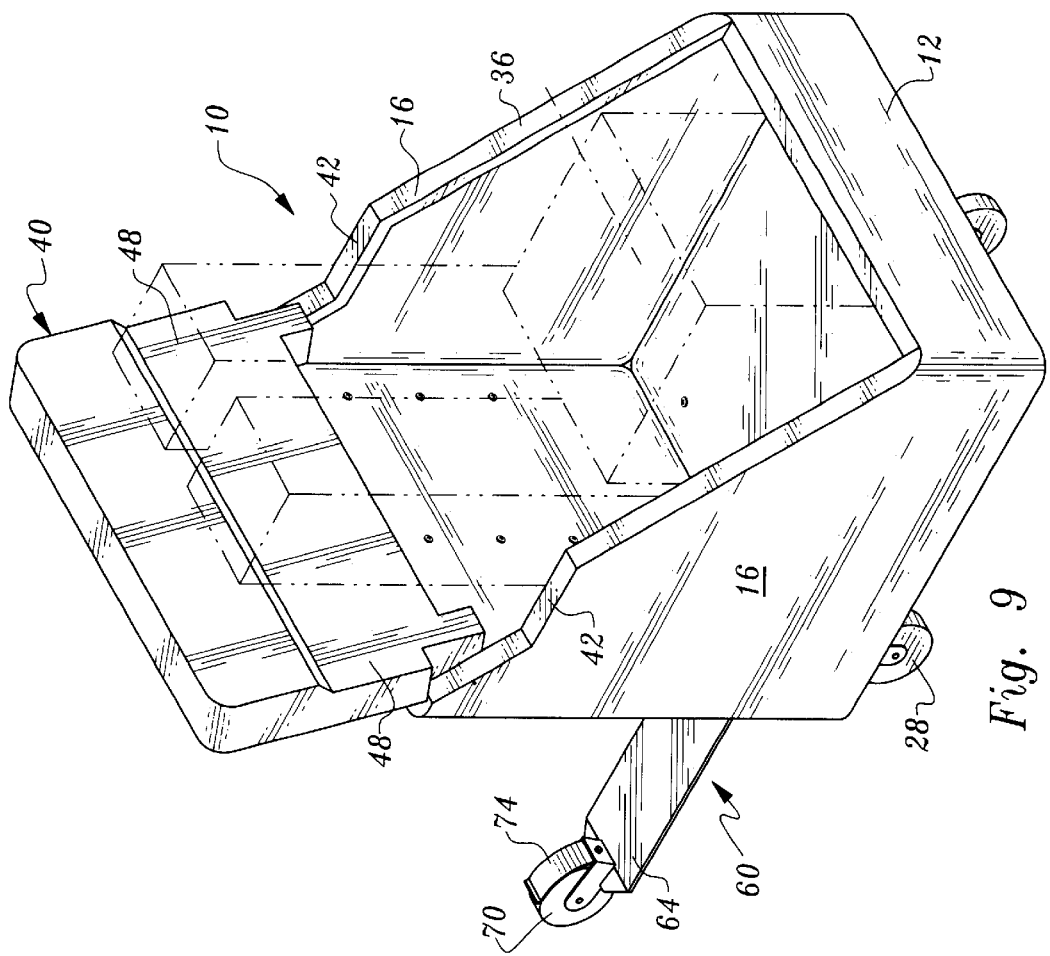

TRANSPORT APPARATUS

TECHNICAL FIELD

This invention relates to transport apparatus and more particularly to transport apparatus for use by an individual to transport one or more articles on a surface with the individual providing the motive power. The invention has application, for example, when filling parts orders, stocking items or while carrying out janitorial or other maintenance services.

BACKGROUND OF THE INVENTION

The use of conventional pull carts or push carts while performing various tasks is well known. Also known are a variety of electrically or internal combustion powered transport vehicles which are employed, for example, in warehouses and other industrial locations to transport articles.

As will be seen below, the transport apparatus of the present invention is human powered and is propelled by an individual standing with one foot on the transport apparatus and utilizing the other to propel the apparatus.

Scooter type devices propelled by a foot or feet of an individual are of course well known. The following patents are believed to be representative of the current state of the prior art in this field: U.S. Pat. No. 1,006,708, issued Oct. 24, 1911, U.S. Pat. No. 1,059,152, issued Apr. 15, 1913, U.S. Pat. No. 1,124,897, issued Jan. 12, 1915, U.S. Pat. No. 1,289,361, issued Dec. 31, 1918, U.S. Pat. No. 1,644,535, issued Oct. 4, 1927, U.S. Pat. No. 1,874,792, issued Aug. 30, 1932, U.S. Pat. No. 2,134,318, issued Oct. 25, 1938, U.S. Pat. No. 3,314,494, issued Apr. 18, 1967, U.S. Pat. No. 3,374,000, issued Mar. 19, 1968, U.S. Pat. No. 3,949,999, issued Apr. 13, 1976, U.S. Pat. No. 4,323,258, issued Apr. 6, 1982, U.S. Pat. No. 5,011,169, issued Apr. 30, 1991, U.S. Pat. No. 5,090,716, issued Feb. 25, 1992 and U.S. Pat. No. 5,193,831, issued Mar. 16, 1993.

A device called a "skate cart" has been employed in a warehouse environment which employs a metallic walled receptacle or hopper supported by three wheels and a "skate board"-like member swivel mounted thereto and extended from the rear of the receptacle. The member is biased by springs toward a central position extending straight back from the receptacle and includes a flat platform supporting a user's foot. Because the wheels of the skateboard are located directly under the flat platform, the platform is elevated to such a degree that the device is degraded ergonomically and is prone to cause injury to a user during repeated use, particularly the user's hip area. Furthermore, the high platform causes stability problems which promote accidents. Further contributing to the potential for accidents is the lack of any type of braking system on the "skate cart". The "skate cart" is formed of many different metal pieces which must be assembled, adding to the cost of the device. The "skate cart" includes a tiltable tray pivotally connected to the receptacle. When in a horizontal condition the tray is supported by metal brackets extending inwardly from receptacle side walls.

The prior art arrangements do not teach the structural combination of the transport apparatus as described and claimed herein.

DISCLOSURE OF INVENTION

The transport apparatus of the present invention is highly maneuverable in tight places and is highly stable and strong. Transport of articles from one location to another is carried out quickly and efficiently, much faster than when a conventional pull cart or push cart is utilized. Furthermore, the transport apparatus of this invention is actually fun to use and requires less energy than conventional carts employed to fill parts orders, stock items, etc.

The present invention relates to transport apparatus for use by an individual to transport one or more articles on a surface.

The transport apparatus includes a receptacle having a front wall, a back wall, opposed, spaced side walls attached to and extending between the front wall and the back wall and a bottom. The bottom has a bottom trailing end with two rear bottom corners and a bottom lead end with two front bottom corners.

A pair of spaced rear receptacle wheels are connected to the bottom at the bottom trailing end and disposed at the rear bottom corners.

A front receptacle wheel is connected by a swivel to the bottom and disposed at the bottom front end at a location substantially equidistant from the front bottom corners.

The transport apparatus also includes a support board for supporting an individual when the individual's foot is on the support board. The support board has a front board end and a rear board end.

A swivel connector connects the front board end to the receptacle at a location substantially equidistant from the rear receptacle wheels, the support board projecting rearwardly of the receptacle.

A support board wheel is located at the rear board end, the support board being maintained above the surface by the support board wheel and the swivel connector. The support board is rotatable about the swivel connector to laterally displace the support board wheel and the rear board end relative to the receptacle.

Other features, advantages and objects of the present invention will become apparent with reference to the following description and accompanying drawings.

BRIEF DESCRIPTION OF DRAWINGS

FIG. 5 is an enlarged side, elevational view of a portion of the apparatus receptacle and front receptacle wheel associated therewith;

FIGS. 6–8 are bottom views of the apparatus and showing the support board in alternate positions relative to the receptacle;

FIG. 9 is a view similar to FIG. 1, but illustrating a tray connected to the receptacle disposed at a different orientation than that shown in FIG. 1;

FIG. 10 is a side view of the receptacle and tray in the same relative positions as shown in FIG. 9; and FIG. 11 is an enlarged side elevational view of the front end of the support board, associated swivel connector and receptacle bottom portion.

BEST MODE FOR CARRYING OUT THE INVENTION

Figure 1:
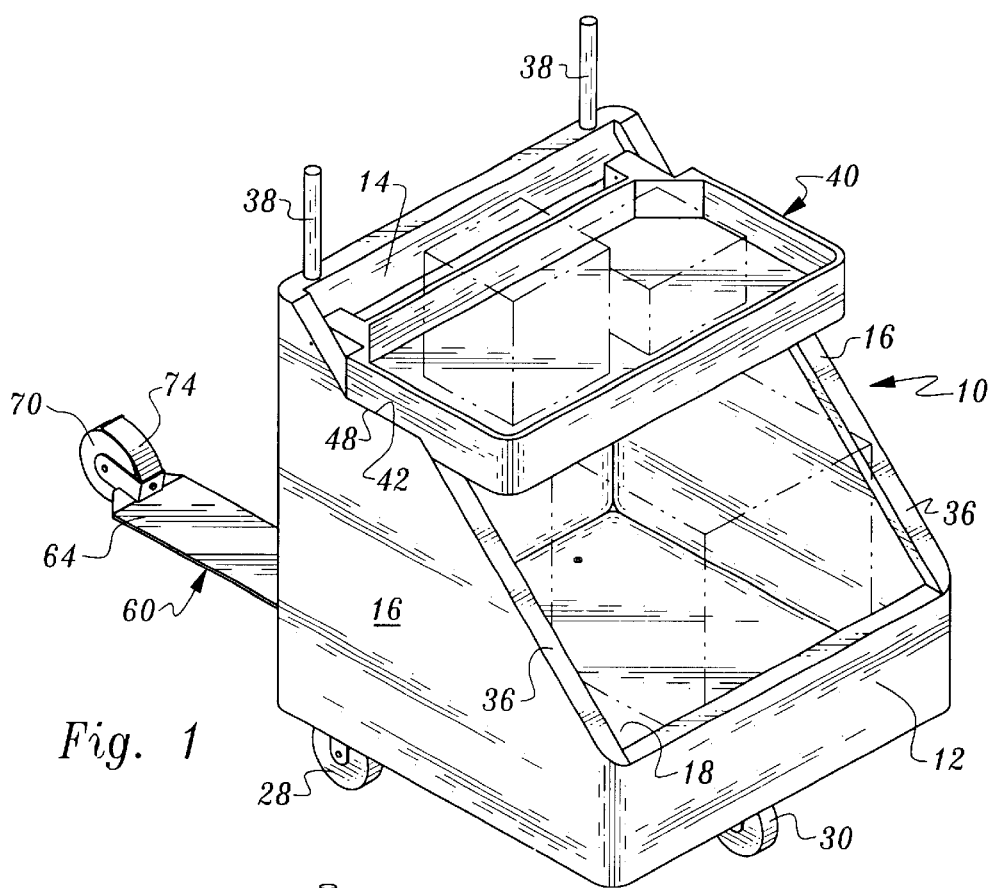
FIG. 1 is a frontal, perspective view of a preferred form of apparatus constructed in accordance with the teachings of the present invention holding a plurality of articles, the articles being shown in phantom.

The transport apparatus is for use by an individual to transport one or more articles on a surface, such as a warehouse floor. FIGS. 1 and 9 show objects or articles held by the apparatus for transport, the articles being depicted by phantom lines.

The transport apparatus includes a receptacle 10 which may suitably be formed of durable, long-lasting, non-abrasive polyethylene plastic material. The receptacle has a front wall 12, a back wall 14, opposed, spaced side walls 16 attached to and extending between the front wall and the back wall and a bottom 18.

Bottom 18 has a bottom trailing end 20 and a bottom lead end 22. The bottom trailing end has two rear bottom corners 24 and the bottom lead end has two front bottom corners 26.

A pair of spaced rear receptacle wheels 28 are connected to the bottom at the bottom trailing end and are disposed at the rear bottom corners. The wheels 28 rotate but do not swivel.

A front receptacle wheel 30 is connected by a swivel 32 to the bottom 18 and the wheel 30 is disposed at the bottom lead end at a location substantially equidistant from the front bottom corners 26. The front receptacle wheel is canted as may best be seen with reference to FIG. 5.

The back wall 14 of the receptacle 10 is of greater height than the front wall 12. The side walls 16, which are of identical configuration, are generally tapered and have upper side wall edges 36 extending upwardly and rearwardly from the front wall to the back wall. Handles 38 project upwardly from the back wall.

The receptacle defines a top opening and the transport apparatus additionally comprises a tray 40 which is pivotally connected to the side walls of the receptacle by suitable pivot means (not shown) such as pivot pins.

Figure 2:
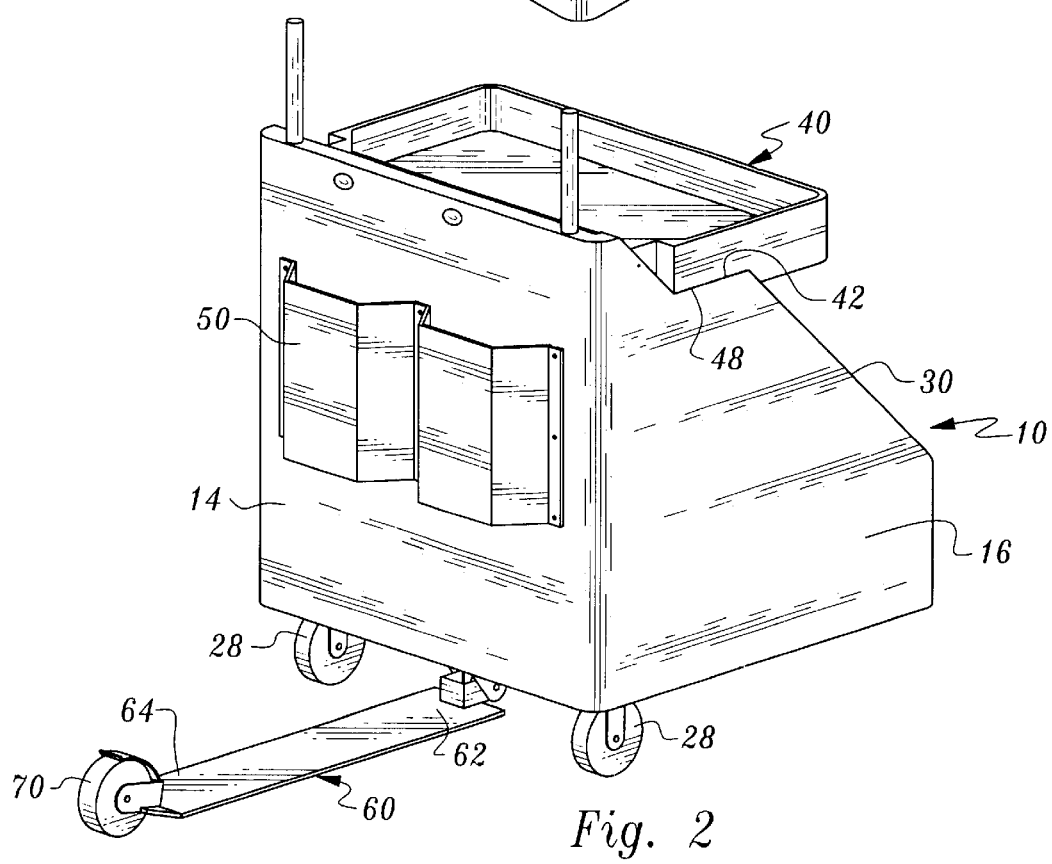
FIG. 2 is a rear, perspective view of the apparatus.

The tray 40 is selectively manually movable between a first position (shown in FIGS. 1, 2 and 3) wherein the tray is substantially horizontal and disposed over the top opening of the receptacle and a second position (shown in FIGS. 9 and 10) wherein the tray is generally vertically disposed and does not substantially cover the top opening. The tray in the second position is slightly tilted toward the rear of the transport apparatus when in the second position.

The upper side wall edge 36 of each of the side walls 16 includes a first bearing surface 42. The first bearing surfaces of the side wall edges are substantially parallel to the bottom of the receptacle.

The tray 40 engages and is supported by the first bearing surfaces 42 of the side wall edges when the tray is horizontally disposed. In the arrangement illustrated, the tray side walls extending upwardly from the tray bottom define indents 48 for receiving portions of the side walls adjoining the first bearing surfaces. This construction provides additional stability and support for the tray.

When the tray 40 is manually pivoted from its horizontal orientation to its generally vertical orientation wherein the tray is slightly inclined in the direction of the back of the receptacle, the tray will engage at least one second bearing surface, as shown in FIGS. 9 and 10, to maintain the tray in the desired position under the influence of gravity. In the arrangement illustrated, the tops of handles 38 form second bearing surfaces engaged by the tray. Of course, other parts of the apparatus, such as the upper edge of back wall 14, or a portion of the side wall upper edges, could constitute second bearing surfaces. When the tray 40 is in its second position the receptacle can be utilized to hold and transport taller articles, as represented in the phantom line depiction provided in FIG. 9. Pockets 50 are applied to the back wall 14 to hold still additional objects (not shown).

Figure 3:
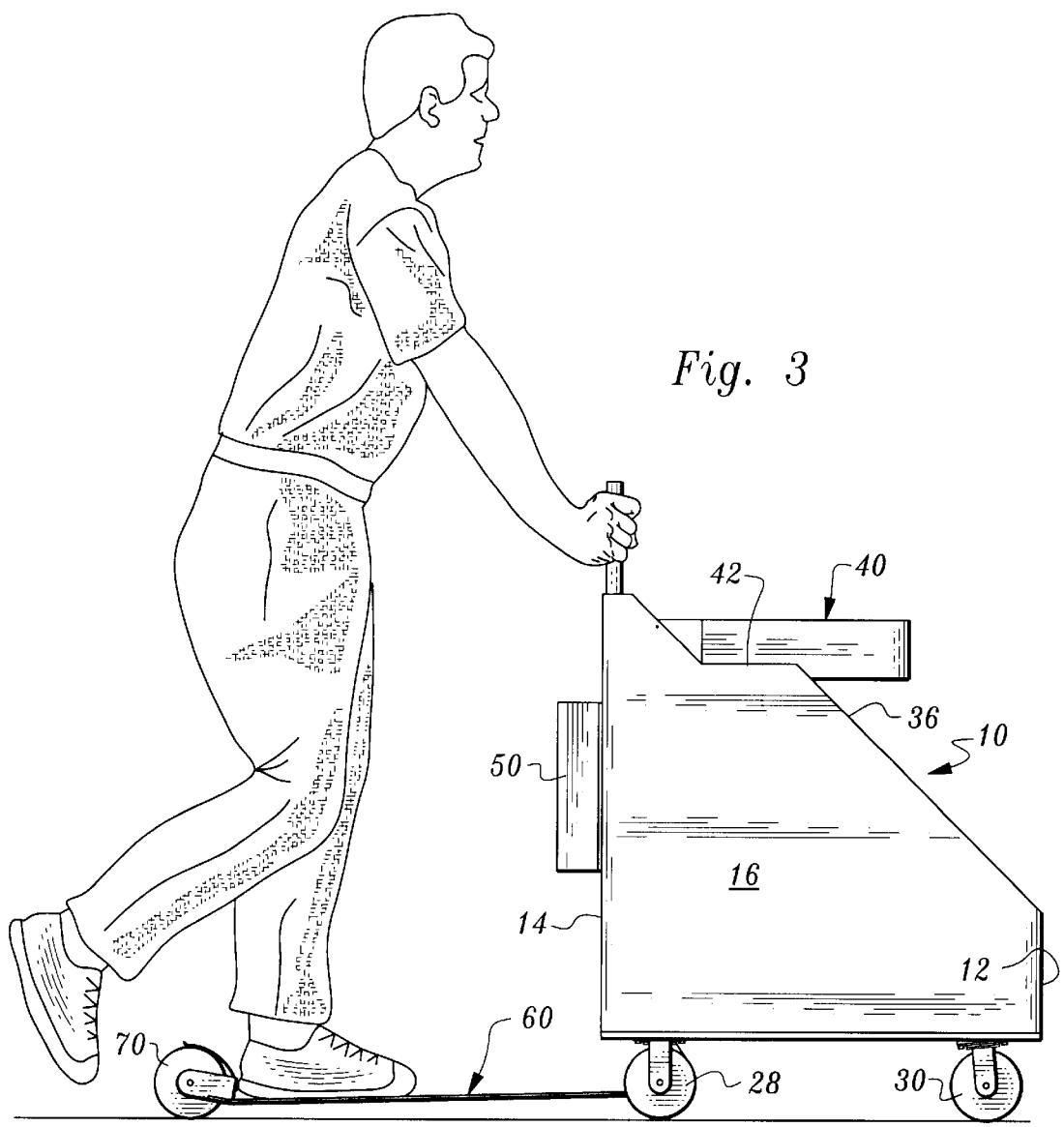
FIG. 3 is a side, elevational view illustrating an individual propelling the apparatus on a floor or other surface.
Figure 4:
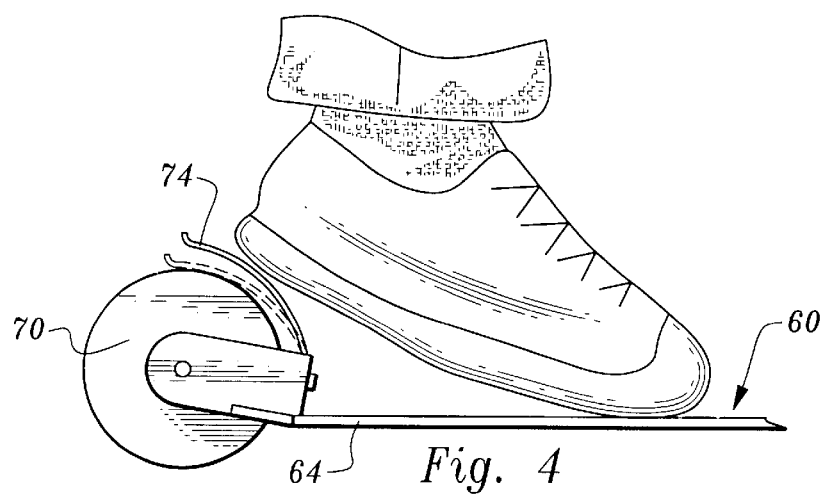
FIG. 4 is an enlarged, side, elevational view illustrating a foot actuated brake attached to the support board of the apparatus and an individual's foot in position to actuate the brake.

The transport apparatus also includes a support board 60 for supporting an individual when the individual's foot is on the support board (see FIG. 3). The support board 60 has a front board end 62 and rear board end 64.

A swivel connector 68 (see FIG. 11) connects the front board end 62 to the receptacle 10 at a location on the receptacle bottom substantially equidistant from the rear receptacle wheels. The pivot axis of the swivel connector is centered with respect to the receptacle on an imaginary straight line extending between the rear receptacle wheels 28. However, the swivel connector is canted so the location of interconnection between the front board end and the swivel connector is displaced from that imaginary. In the arrangement illustrated, such displacement is forward of the imaginary line. Such displacement is important since it has been found that the apparatus can have a tendency to "pop a wheelie", i.e. cause lifting of wheel 30, if the swivel pivot axis of connector 68 is in alignment with wheels 28. The support board 60 projects rearwardly of the receptacle.

A support board wheel 70 is located at the rear board end, the support board being maintained above the floor or other surface by the support board wheel and the swivel connector. The support board is readily rotatable about the swivel connector 68 to laterally displace the support board wheel and the rear board end relative to the receptacle when the transport apparatus is in use. FIGS. 6–8 depict such movement. No springs are associated within the support board to impede free pivotal movement of the board.

The combination of structural elements described above provide the transport apparatus with a high degree of stability and maneuverability, features particularly useful when tight spaces are encountered.

The support board includes a flat support board portion actually engaged by and supporting the user's foot. The rear board end extends upwardly from the flat support board portion and the wheel 70 extends above the level of the flat support board portion. This enables the flat support board portion to be placed close to the floor supporting the apparatus, e.g. one inch from the floor. This not only adds to the stability and the safety of the apparatus, it improves the ergonomics thereof. By keeping the user's supported foot low to the ground, potentially harmful stresses which might otherwise be applied to the user's hip or other parts of the body are prevented. In the arrangement illustrated, a foot actuated brake 74 in the form of a curved spring metal plate is attached to the support board over the wheel 70. By lowering his or her foot, the user of the transport apparatus can bring the brake 74 into engagement with the wheel 70 to stop or retard movement.

The invention claimed is:

1. Transport apparatus for use by an individual to transport one or more articles on a surface, said transport apparatus comprising, in combination:

a receptacle of molded plastic construction having a front wall, a back wall, opposed, spaced side walls attached to and extending between said front wall and said back wall and a bottom, said bottom having a bottom trailing end with two rear bottom corners and a bottom lead end with two front bottom corners;

a pair of spaced rear receptacle wheels connected to said bottom at said bottom trailing end and disposed at said rear bottom corners;

a front receptacle wheel connected by a swivel to said bottom and disposed at said bottom front end at a location substantially equidistant from said front bottom corners;

a support board for supporting an individual when the individual's foot is on said support board, said support board having a front board end and a rear board end;

a swivel connector connecting said front board end to said receptacle at a location substantially equidistant from said rear receptacle wheels, said support board projecting rearwardly of said receptacle;

a support board wheel located at said rear board end, said support board being maintained above said surface by said support board wheel and said swivel connector, said support board being non-biased and rotatable about said swivel connector to laterally displace said support board wheel and said rear board end relative to said receptacle, the back wall of said receptacle being of greater height than the front wall of said receptacle and said side walls being generally tapered and having upper side wall edges extending upwardly and rearwardly from said front wall to said back wall, said receptacle defining a top opening; and a tray pivotally connected to said receptacle and selectively manually movable between a first position wherein said tray is substantially horizontally disposed over said top opening and engaging and supported by said upper side wall edges and a second position wherein said tray is generally vertically disposed and does not substantially cover said top opening or engage said upper side wall edges.

2. The transport apparatus according to claim 1 wherein the upper side wall edge of each of said side walls includes a first bearing surface, said tray engaging and being supported by the first bearing surfaces of the side wall edges when said tray is in said first position, and said transport apparatus including a second bearing surface, said tray engaging and being supported by the second bearing surface when said tray is in said second position.

3. The transport apparatus according to claim 2 wherein said tray includes a tray bottom and tray side walls, said tray at said side walls defining indents for receiving portions of said side walls adjoining said first bearing surfaces.

4. The transport apparatus according to claim 3 wherein said first bearing surfaces of said side wall edges are substantially parallel to the bottom of said receptacle.

5. The transport apparatus according to claim 1 wherein said support board includes a flat support board portion engageable by an individual's foot, said rear board end extending upwardly from said flat support board portion whereby said support board wheel extends above the level of said flat support board portion.

6. The transport apparatus according to claim 1 wherein the pivot axis of said swivel connector is substantially centered along an imaginary straight line extending between said rear receptacle wheels, said front board end being attached to said swivel connector at a location displaced from said imaginary straight line.

7. The transport apparatus according to claim 1 additionally comprising a foot actuated brake attached to said support board for selective frictional engagement with said support board wheel.

8. The transport apparatus according to claim 1 wherein said front receptacle wheel is canted.

9. The transport apparatus according to claim 1 wherein said tray is pivotally connected to said side walls.

10. Transport apparatus for use by an individual to transport one or more articles on a surface, said transport apparatus comprising, in combination:

a receptacle having a front wall, a back wall, opposed, spaced side walls attached to and extending between said front wall and said back wall and a bottom, said bottom having a bottom trailing end with two rear bottom corners and a bottom lead end with two front bottom corners;

a pair of spaced rear receptacle wheels connected to said bottom at said bottom trailing end and disposed at said rear bottom corners;

a front receptacle wheel connected by a swivel to said bottom and disposed at said bottom front end at a location substantially equidistant from said front bottom corners;

a support board for supporting an individual when the individual's foot is on said support board, said support board having a front board end and a rear board end;

a swivel connector connecting said front board end to said receptacle at a location substantially equidistant from said rear receptacle wheels, said support board projecting rearwardly of said receptacle and said front board end being attached to said swivel connector at a location displaced from an imaginary straight line extending between said rear receptacle wheels; and a support board wheel located at said rear board end, said support board maintained above said surface by said support board wheel and said swivel connector, said support board being non-biased and rotatable about said swivel connector to laterally displace said support board wheel and said rear board end relative to said receptacle, said support board including a flat support board portion engageable by an individual's foot and said rear board end extending upwardly from said flat support board portion whereby said support board wheel extends above the level of said flat support board portion.

* * * * *